(12) United States Patent
Diggins et al.

(10) Patent No.: US 10,719,550 B2
(45) Date of Patent: Jul. 21, 2020

(54) HASH-BASED MEDIA SEARCH

(71) Applicant: GRASS VALLEY LIMITED, Berkshire (GB)

(72) Inventors: Jonathan Diggins, Lovedean (GB); Gerard Phillips, Winchester (GB)

(73) Assignee: GRASS VALLEY LIMITED, Newbury, Berkshire (GB)

( * ) Notice: Subject to any disclaimer, the term of this patent is extended or adjusted under 35 U.S.C. 154(b) by 545 days.

(21) Appl. No.: 15/321,570

(22) PCT Filed: Jun. 23, 2015

(86) PCT No.: PCT/GB2015/051831
§ 371 (c)(1),
(2) Date: Dec. 22, 2016

(87) PCT Pub. No.: WO2015/198036
PCT Pub. Date: Dec. 30, 2015

(65) Prior Publication Data
US 2017/0161304 A1 Jun. 8, 2017

(30) Foreign Application Priority Data
Jun. 24, 2014 (GB) .................................. 1411192.6

(51) Int. Cl.
*G06F 17/30* (2006.01)
*G06F 16/58* (2019.01)
(Continued)

(52) U.S. Cl.
CPC .......... *G06F 16/5866* (2019.01); *G06F 16/51* (2019.01); *G06F 16/5838* (2019.01);
(Continued)

(58) Field of Classification Search
CPC .................................................. G06K 9/00758
See application file for complete search history.

(56) References Cited

U.S. PATENT DOCUMENTS 8,611,689 B1 * 12/2013 Yagnik ............. H04N 21/23418
380/210
8,655,878 B1 2/2014 Kulkarni et al.
(Continued)

FOREIGN PATENT DOCUMENTS

EP 2149098 A1 2/2010
GB 2460844 A 12/2009

OTHER PUBLICATIONS

Li, Mu et al., "Robust Video Hashing via Multilinear Subspace Projections", IEEE Transactions on Image Processing, vol. 21, No. 10, Oct. 2012, pp. 4397-4409.
(Continued)

*Primary Examiner* — Usmaan Saeed
*Assistant Examiner* — William P Bartlett
(74) *Attorney, Agent, or Firm* — Arent Fox LLP

(57) ABSTRACT

A method of identifying an item of video content involves providing a spatial hash value and a temporal hash value for each image in a video collection. Each hash value is based on a measure of the entropy in differences between pixel values. A table of the pair of hash values against timecode is created and ordered according to one of the hash values. A search for a given pair of hash values can then be confined to that part of the table that matches the first value.

27 Claims, 2 Drawing Sheets

(51) Int. Cl.
*G06F 16/51* (2019.01)
*G06F 16/783* (2019.01)
*G06F 16/583* (2019.01)
*G06K 9/00* (2006.01)

(52) U.S. Cl.
CPC ....... *G06F 16/783* (2019.01); *G06K 9/00744* (2013.01); *G06K 9/00758* (2013.01)

(56) References Cited

U.S. PATENT DOCUMENTS

| | | | | |
|---|---|---|---|---|
| 8,947,595 | B1* | 2/2015 | Tucker | H04N 21/231 348/445 |
| 2007/0253594 | A1* | 11/2007 | Lu | G06K 9/00744 382/100 |
| 2009/0141805 | A1 | 6/2009 | Lu et al. | |
| 2010/0106756 | A1* | 4/2010 | Ellison | G06F 7/58 708/212 |
| 2014/0052737 | A1* | 2/2014 | Ramanathan | G06K 9/00744 707/747 |

OTHER PUBLICATIONS

Stavros Paschalaki S et al., "The MPEG-7 Video Signature Tools for Content Identification", IEEE Transactions on Circuits and Systems for Video Technology, vol. 22, No. 7, Jul. 1, 2012 (Jul. 1, 2012), pp. 1050-1063, Institute of Electrical and Electronics Engineers.

Oostveen J et al. "Feature Extraction and a Database Strategy for Video Fingerprinting", Security in Communication Networks: Third International Conference, vol. 2314, Mar. 11, 2002 (Mar. 11, 2002), pp. 117-128, Electronic Publishing, Artistic Imaging, and Digital Typography.

Kim C et al., "Spatiotemporal Sequence Matching for Efficient Video Copy Detection", IEEE Transactions on Circuits and Systems for Video Technology, vol. 15, No. I, Jan. 1, 2005 (Jan. 1, 2005), pp. 127-132, Service Center, Piscataway, NJ.

International Search Report and Written Opinion for Application No. PCT/GB2015/051831 dated Oct. 21, 2015 (13 pages).

* cited by examiner

HASH-BASED MEDIA SEARCH

FIELD OF INVENTION

This invention concerns searching of sequential data and is particularly directed to the matching of video sequences to detect visual equivalence.

BACKGROUND OF THE INVENTION

In broadcasting and audiovisual content production and distribution systems it is often necessary to confirm the identity of a video sequence at some point in a system. This is an essential feature of a monitoring process that ensures the correct operation of an automated playout system. A well-known method is to associate metadata with video frames and to compare the metadata associated with an unknown video sequence with the metadata from a known video sequence so as to enable a particular item of content to be identified. However, this relies on the presence and integrity of the metadata.

UK patent application 1402775.9 describes how metadata describing spatial and temporal characteristics of an audiovisual stream can be automatically derived from an audiovisual sequence, thus ensuring the availability of accurate metadata from an available audiovisual sequence.

International patent application WO 2009/104022 describes how spatial and temporal 'signatures' can be derived from audiovisual data. These types of signature, also known as 'fingerprints', enable video fields or frames or sequences of fields or frames to be characterised. In this specification the term fingerprint is used to designate such characterising data and the term image is sometimes used for convenience to denote either a field or a frame.

SUMMARY

The present invention consists in one aspect in a method of identifying an item of video content, the method comprising the steps of providing a collection of temporally separated search images, each defined by pixel values and each having a temporal location in the collection; for each search image, providing a pair of search hash values comprising: a spatial search hash value comprising a function of values of differences between pixel values within a search image, and a temporal search hash value comprising a function of values of differences between a pixel value in one search image and a pixel value in a temporally separated search image; forming search data defining the association between the temporal positions of the search images in the collection and the respective spatial and temporal search hash values; ordering said search data according to the values of a first one of the hash values; for a sought sequence of temporally separated sought images, each defined by pixel values and each having a temporal location in the sought sequence, providing: a spatial sought hash value comprising a function of values of differences between pixel values within a sought image, and a temporal sought hash value comprising a function of values of differences between a pixel value in one sought image and a pixel value in a temporally separated sought image; and searching only the portion of ordered data corresponding to a sought value of the said first one of the pair of hash values to locate the occurrence of a sought value of the second one of the said pair of hash values.

Values of differences between pixel values may be aggregated over search images in a the group, which may be a traveling window of search images.

The hash values may comprise a function of frequencies of occurrence of particular values of differences between pixel values and preferably of frequencies of occurrence of particular values of differences between average pixel values for image regions. Frequency values for infrequently-occurring difference values may be given higher weight than frequently-occurring frequencies. Frequency values may be normalised by reducing them in proportion to the sum of the magnitudes of the said differences to obtain a frequency value less than unity and that value may be weighted by its logarithm prior to summation. More generally, each hash value may comprise a function of a measure of the entropy in said values of differences between pixel values. The measure of entropy may be given by:

$$-\Sigma pN \cdot \log(pN)$$

where pN is the normalised frequency of occurrence of a pixel difference value N and where the summation is over all possible values of N.

Values of differences between pixel values used in forming search hash values may be formed from one or more respective fingerprints of search or sought images.

The present invention consists in a different aspect in apparatus for identifying an item of video content, wherein a match is sought between respective pairs of hash values for one or more sequences of images, the pair of hash values comprising: a spatial search hash value comprising a function of values of differences between pixel values within a search image, and a temporal search hash value comprising a function of values of differences between a pixel value in one search image and a pixel value in a temporally separated search image; the apparatus comprising: a first look up table defining the association between the temporal positions of images of a search item and respective hash value pairs ordered according to the values of a first one of the said pair of hash values; a second look up table defining the portion of ordered data in the first look up table corresponding to any particular value of the said first one of the pair of hash values; and a search processor cooperable with said look up tables to search only that portion of ordered data corresponding to a sought value of the said first one of the pair of hash values to locate the occurrence of a sought value of the second one of the said pair of hash values.

It will be understood that the method and apparatus may be implemented in a wide variety of ways, including hardware and software applications involving dedicated hardware, programmable hardware; software capable of running on general purpose computers and combinations of the foregoing.

DETAILED DESCRIPTION OF THE INVENTION

Figure 1:
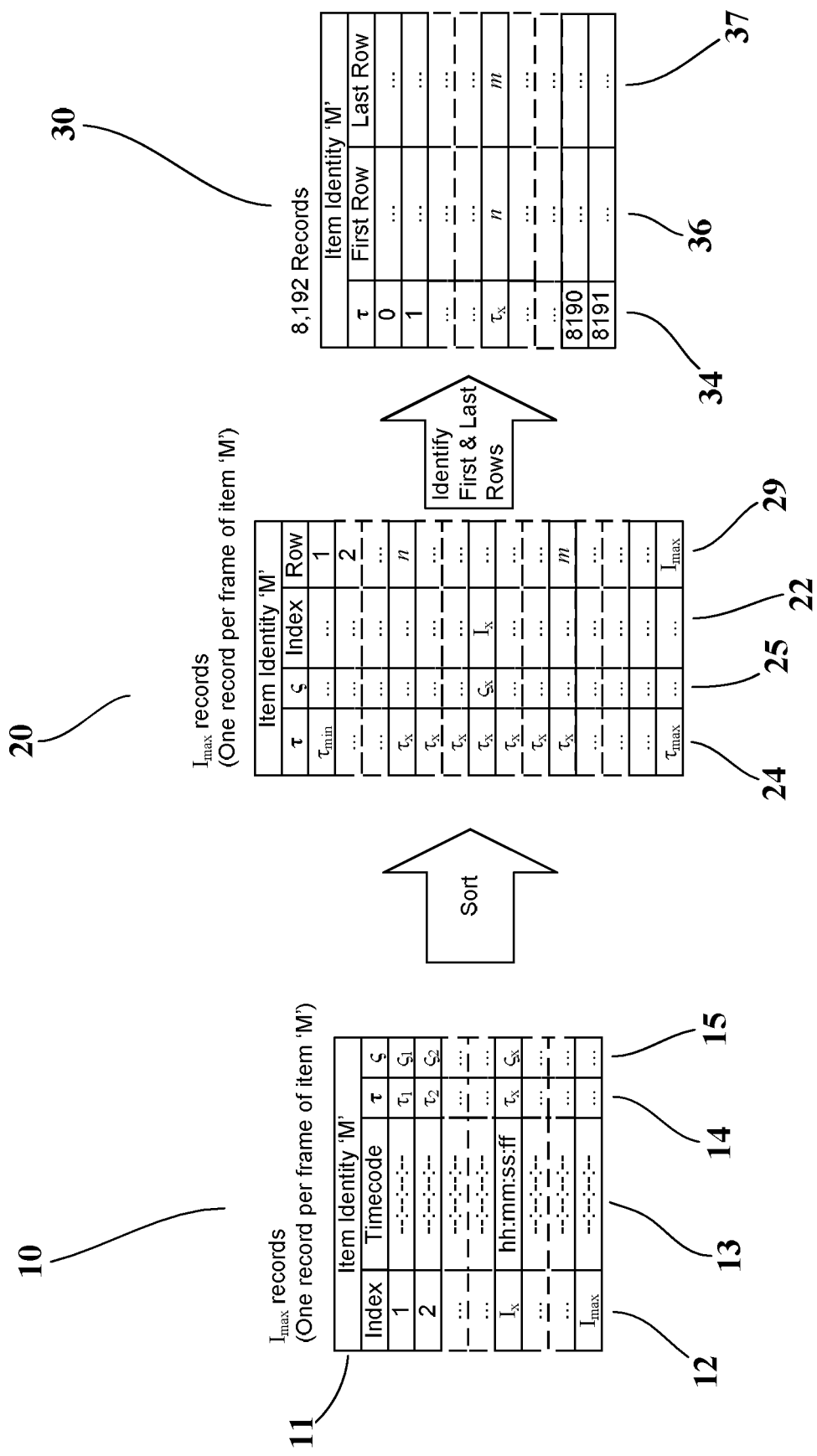
FIG. 1 shows the processing of hash values of spatial and temporal fingerprint data for an item of video content according to an embodiment of the invention.

The invention provides a novel way of searching one or more sequential streams of data to find a matching occurrence of a short 'query data sequence'. For example, a video stream at a point in a distribution network can be processed, as described in the above mentioned International patent application, to obtain spatial and temporal 'fingerprint' data for a short sequence of video frames. A large library of video content can then be searched to locate the particular content item in which the fingerprint sequence is matched, and to identify the position (timecode value) of the match within that item. In this way it can be confirmed that the distribution network is providing the expected video content. If the fingerprint data is derived from spatial and temporal variations of pixel values within predetermined regions of the video frames, it is possible to match content which has been converted to a different format, for example from high-definition to standard-definition, or subjected to compression processing.

An exemplary embodiment of the invention to locate a query sequence of video frames in a library of video content will now be described. A one-second-long query sequence is processed to obtain respective sequences of spatial and temporal 'fingerprint values'—a spatial fingerprint value and a temporal fingerprint value for every frame of the query sequence. The spatial fingerprint is derived from average pixel values for defined regions within the respective frame; and the temporal fingerprint represents an average pixel value difference between the respective frame its preceding frame. Suitable fingerprints include the 'signatures' described in detail in international patent application WO 2009/104022.

In a similar way, all the items in the video content library are processed to obtain spatial and temporal fingerprint values for every frame. This, of course, is a major task. However, the process can conveniently be carried out automatically when the various content items are 'ingested' into the library, and it is done prior to the search process.

It is clearly completely impractical to search for a particular sequence of fingerprint values across a library of thousands of hours of content. The spatial and temporal fingerprint sequences are therefore processed to form respective 'hash values' that are characteristic of a short sequence of video frames—a sequence of one second duration in the present example. For each content item a data-set of spatial and temporal hash values, and the respective temporal positions within the item of the frames characterised by the hash values, is constructed. In the present example the timecode value for every frame is associated with a spatial hash value and a temporal hash value characterising the one-second-long sequence of frames that begins with that frame. The derivation of these hash values will be described in detail below. However, even after characterising each frame by two hash values, the task of searching for particular hash values is still impractical, even for a modest sized content library.

Therefore, for each item of video content in the library, the data-set of hash values and their respective temporal positions is processed so as to simplify the search. This data reorganisation process is illustrated in FIG. 1. In the Figure, the data is represented for the purpose of explanation as tables, and the process will be described as a sequence of operations in which new tables are created from an existing table. As the skilled person will appreciate, these processes may be implemented in many ways, for example by creating relationships within a relational database, by moving and copying data items in electronic memory, or by other known data manipulation processes.

The data-set resulting from the initial creation of spatial and temporal hash values for a particular item of video content is shown in FIG. 1 by the table (10). This data comprises a content item identity field (11), and a set of $I_{max}$ data records indexed by an index data field (12). Each indexed record comprises the following data fields:

A timecode value in hours, minutes, seconds and frames (13) that identifies the first field of the one second sequence of fields from which temporal and spatial hash values have been derived;

A temporal hash value τ (14) for the one second sequence; and,

A spatial hash value ζ (15) for the one second sequence.

The records of the table (10) are sorted, according to the temporal hash value τ (14), to create a second table (20), also comprising $I_{max}$ data records, each record containing the following data fields:

The temporal hash value τ (24);

The spatial hash value ζ (25);

The index value (22); and,

A row number (29), that sequentially identifies each record.

The sort process orders the fields of the table (20) so that records having a particular value of the temporal hash value τ (24) appear contiguously. A record with the lowest occurring value $τ_{min}$ is the first record, at row number one; and, a record with the highest occurring value $τ_{max}$ is the last record at row number $I_{max}$.

The records of table (20) are then processed to create a table (30), having one record for every occurring value of the temporal hash τ (24). Each record of the table (30) comprises:

A temporal hash value τ (34);

A first-row field (36) that is the row number (29) of the first occurrence of the respective temporal hash value in table (20); and, A last-row field (37) that is the row number (29) of the last occurrence of the respective temporal hash value in table (20).

The table (30) is ordered by the temporal hash value (34), and is very much smaller than tables (10) and (20) because it has only one record for each possible value of the temporal hash. The process of creating the table (30) from the table (20) requires only a single pass through the data of table (20). The row numbers (29) of the first and last rows of each contiguous block of records with the same temporal hash value are recorded with the respective temporal hash as the rows of the table (30). If a particular temporal hash value does not occur in the data for a particular content item, then a suitable 'null value' is inserted in the first-row field (36) and the last-row field (37).

As will be explained below, one example of a suitable temporal hash has 8,192 possible values, whereas a single hour of video content will typically be characterised by 90,000 records in each of the tables (10) and (20). The data records of the tables (10), (20) and (30) constitute a searchable index for a particular item of video content, and are stored in the library and associated with the respective content item. Similar sets of data records are prepared and stored for all content items in the library.

The process of finding a content item, and a temporal position within it that corresponds with fingerprint data from a query sequence, will now be described with reference to FIG. 2. The tables (210), (220) and (230) shown in this figure are identical with the tables (10) (20) and (30) of FIG. 1.

The frames of a one-second-duration segment of the query sequence are processed to derive respective temporal and spatial fingerprints. The set temporal fingerprints is combined into a temporal hash value $\tau_x$, and the set of spatial fingerprints is combined into a spatial hash value $\zeta_x$. These hash value derivations are identical with the processes used to form the hash values in the previously described index tables.

Figure 2:
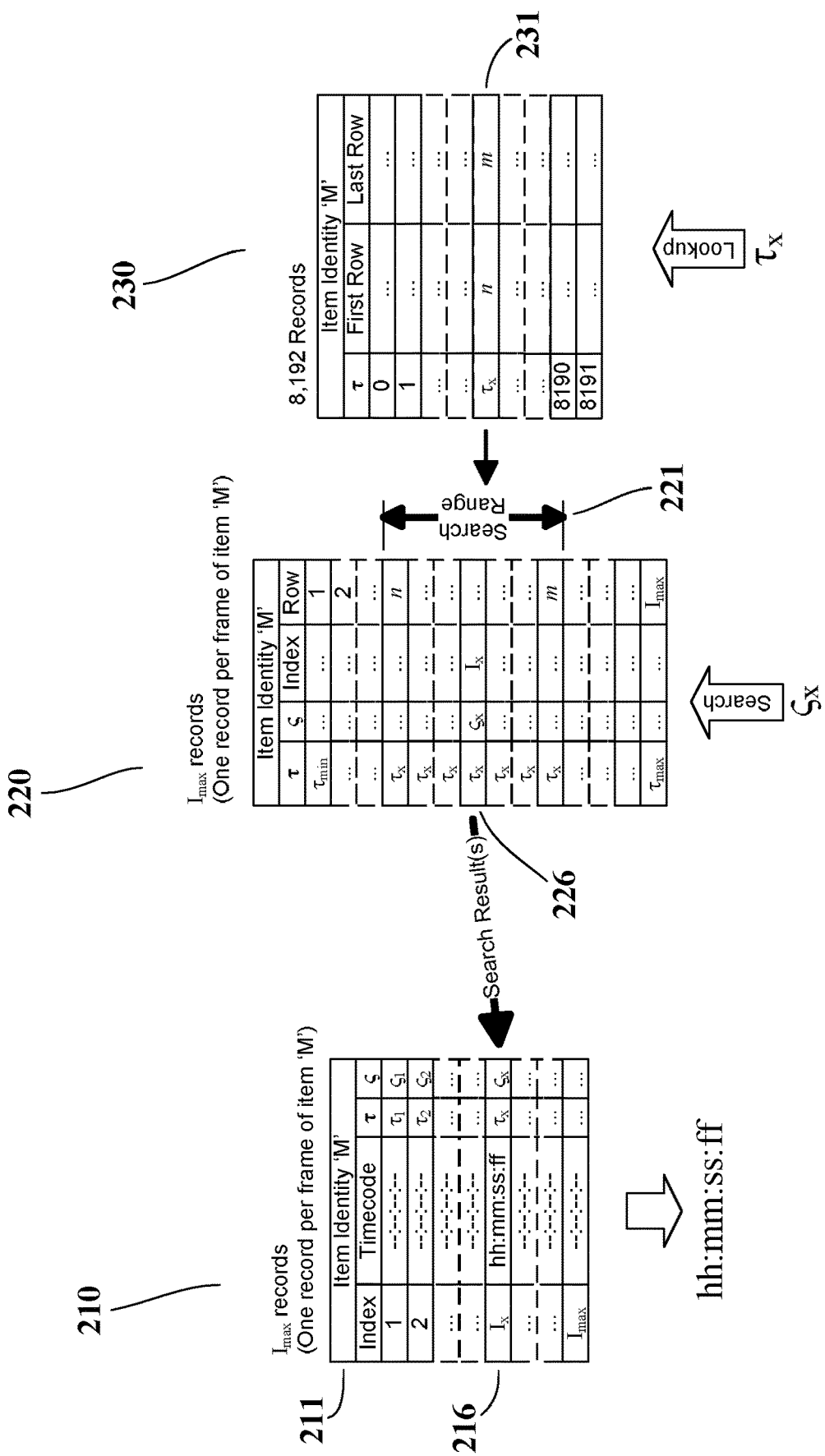
FIG. 2 shows a process according to an embodiment of the invention for searching hash values of spatial and temporal fingerprint data to locate data describing a particular item of video content.

Referring to FIG. 2, the table (230) for the first library item to be searched is retrieved. This table corresponds to the table (30) of FIG. 1. As explained above, its records were ordered according to temporal hash values when it was created. The table (230) is queried with the temporal hash value $\tau_x$. This lookup process returns a first-row number n and a last-row number m from the table row (231) corresponding to $\tau_x$. If null values are returned, because the value $\tau_x$ did not occur in content item 'M', the equivalent table (30) for the next content item to be searched is retrieved from the content library and queried.

The row numbers n and m define a search range (221) within the table (220). The spatial hash fields within this range are searched for the value $\zeta_x$. If this value is not found, the search proceeds to the next content item in the library, and the value of $\tau_x$ is looked-up in its corresponding table (30). However, in the example shown in FIG. 2, the value $\zeta_x$ is found in the row (226) of the table (220). The index value $I_x$ in this row is then queried in the table (210). The query identifies row (216) of the table (210), which includes a timecode value, hh:mm:ss:ff, that defines a possible temporal position of the query video sequence in the content item indexed by the tables (210), (220) and (230) and identified by the content identity field (211).

This result has been obtained by two lookup processes, in the tables (230) and (210) respectively, and one search, over a restricted range of the table (220). Of course this process must be applied in turn to the index tables of each of the items of content in the library, until a successful match of $\tau_x$ and $\zeta_x$ is found.

Typically more than one occurrence of the of associated pair of hash values $\tau_x$ and $\zeta_x$ will be found in the search range (221) of the table (220). In this case, the respective spatial and temporal fingerprint values for all the fields of the one-second sequences characterised by the matched hash values must be searched for the respective pairs of spatial and temporal fingerprints characterising the query sequence.

The inventors have found that the temporal and spatial hash values utilised in examples of this invention are largely uncorrelated. So a particular combination of the temporal hash value $\tau$ and the spatial hash value $\zeta$, should occur infrequently. Using the hashing methods described below, the search typically returns no more than six candidate one-second sequences, and frequently only one or two. For example, in a test of an embodiment of the invention, a search for one frame in 352 hours of video returned 600 temporal hash matches, and only one match for the pair of hash values for that frame.

Suitable hash functions that provide a useful range of infrequently-occurring values will now be described.

The value of the temporal hash function is a scaled and quantised weighted sum of normalised frequencies of occurrence of particular values of signed differences between temporal fingerprints. The summation is made over all the frames of the sequence of frames that is characterised by the hash value. The scaling and quantisation is chosen to obtain a convenient set of integer values: zero to 8,191 in the present example. The normalisation reduces each frequency of occurrence value in proportion to the sum of the magnitudes of the difference values; this results in a frequency value which is less than unity. In the present example the logarithm of this value is used to weight the frequency value so that greater weight is given to infrequently-occurring signed difference values.

The exemplary temporal hash function for a sequence of frames is defined as follows:

Let the temporal fingerprint for frame i be an integer $T_i$ in the range zero to R so that:

The fingerprint-difference value $\delta_i$ for frame i is $(T_i - T_{i-1})$; and, $\delta_i$ has (2R+1) possible values in the range −R to +R.

Let the frequency of occurrence of $\delta_i$ value N within the sequence of F frames be $f_N$, so that:

The normalised frequency of occurrence of $\delta_i$ value N is given by $p_N = f_N \div \Sigma |\delta_i|$ Where: the summation is over the sequence of frames 2 to F; and,

|x| is the magnitude of x.

The weighted normalised frequency of occurrence of $\delta_i$ value N is:

$-p_N \cdot \log(p_N)$

The temporal hash value for the sequence of F frames is then given by:

$\tau = Int[-W \cdot \Sigma p_N \cdot \log(p_N)]$

Where: Int[x] represents the integer part of x;
the summation is over the (2R+1) values of N in the range −R to +R; and
W is a weighting factor that sets the number range for $\tau$.

For base 10 logarithms, and a number range for $\tau$ of zero to 8191, a suitable value of W is of the order of 50,00. However, other weights, and weighting functions, can be used.

A temporal hash value according to the above principles is highly effective for detecting small video segments within a long video sequence, such as a feature film. However, segments comprising identical frames will return zero temporal fingerprint values which will give a zero temporal hash value. (Normalised frequency values greater than unity are considered to give a zero hash value.)

A zero value temporal hash is unsuitable for matching and must therefore be considered a special case. Alternatively, the spatial hash value for a set of identical frames may enable them to be matched, but if this is not possible, then a different temporal segment must be used for matching.

Spatial hash functions will now be described. As explained previously, the spatial fingerprint for a frame describes the average pixel values for a set of regions within that frame; eight horizontally-adjacent regions avoiding the edge regions of the frame are suitable.

The value of the spatial hash function is a scaled and quantised weighted sum of normalised frequencies of occurrence of particular values of signed differences between average pixel values for adjacent regions within each frame of the sequence of frames that is characterised by the hash value. The summation is made over all the frames of the sequence. As in the case of the temporal hash, the scaling and quantisation is chosen to obtain a convenient set of integer values: zero to 8,191 in the present example; and, the normalisation reduces each frequency of occurrence value in proportion to the sum of the magnitudes of all the difference values for all frames of the sequence. And, logarithmic weighting is used that gives greater weight to infrequently-occurring signed difference values.

The skilled will recognise that this example of the hash function is based on a measure of entropy in the difference values. This has the benefit of providing a range of hash values that are—broadly speaking—equally likely to occur. Coupled with the ordering of search items against one of the hash values and the observed lack of correlation between spatial and temporal hash values, there is provided a significant increase in efficiency of the search process.

An exemplary spatial hash function is described below:
Let the spatial fingerprint for frame i be a set of Q integer values $S_{i,q}$ in the range zero to R
so that:
The (Q−1) fingerprint-difference values $\delta_{i,q}$ for frame i are:

$$\delta_{i,1} = (S_{i,2} - S_{i,1})$$
$$\delta_{i,2} = (S_{i,3} - S_{i,2})$$
$$...$$
$$\delta_{i,(Q-1)} = (S_{i,Q} - S_{i,(Q-1)});$$

and,
$\delta_{i,q}$ has (2R+1) possible values in the range −R to +R.
Let the frequency of occurrence of $\delta_{i,q}$ value N within the sequence of F frames be $f_N$
so that:
The normalised frequency of occurrence of $\delta_i$ value N is given by $$p_N = f_N \div \Sigma |\delta_{i,q}|$$

Where: the summation is over all $\delta_{i,q}$, that is to say for:
q values 1 to (Q−1);
i values 1 to F;
and,
|x| is the magnitude of x.
The weighted normalised frequency of occurrence of $\delta_i$ value N is:

$$-p_N \cdot \log(p_N)$$

The spatial hash value for the sequence of F frames is then given by:

$$\zeta = Int[-W \cdot \Sigma p_N \cdot \log(p_N)]$$

Where: Int[x] represents the integer part of x;
the summation is over the (2R+1) values of N in the range −R to +R; and
W is a weighting factor that sets the number range for $\zeta$.

As the function is of the same form as for the temporal hash a similar value for W can be used. However, other weights, and weighting functions, can be used.

As for the temporal hash, there is a special case that does not produce a meaningful value. A completely evenly coloured frame, for example a black frame, will only have zero pixel value differences between the regions characterised by the spatial fingerprint. When such frames also correspond with an absence of temporal differences, a search process must choose a different temporal video segment in order to identify the content.

Although the spatial and temporal hash values are derived in a similar way—by combining information about particular pixel value differences for image regions irrespective of the position (spatial or temporal respectively) of the differenced image regions, and giving greater weight to infrequent difference values—they are completely uncorrelated because the spatial hash is derived from spatial differences, and the temporal hash is derived from temporal differences.

Using these hash functions, the temporal hash match typically reduces the number of candidate one-second content segments by a factor of 10,000, and a subsequent spatial hash match reduces the candidates by an additional factor of 10,000. The number of individual frame fingerprints that must be searched is thus manageably small.

Analysis of 57 million hash value pairs derived as described above from typical video content shows that, if the special cases of zero hash values are excluded, 36% of the possible pairs hash values occur only once; and, 90% of the possible hash values pairs occur fewer than 10 times.

The invention can be implemented in many different ways. The data-set for a content item may be ordered according to spatial hash values, and first and last occurrences of particular spatial hash values used to limit the range of a search for a sought temporal hash value.

The fingerprint values for frames may or may not be retained after using them to create hash values; if necessary fingerprint values can be created for candidate frames of library content at the time of search.

Different spatial and temporal fingerprints may be used, based on different regions within the video frames.

A temporal fingerprint may comprise a plurality of temporal difference values for different regions within the frame, and the frequencies of occurrence of respective difference values for different regions may be combined to create the temporal hash value.

The spatial fingerprint may comprise values for spatial differences, thus obviating the need to form differences at the time of hash value calculation. The spatial fingerprint may be based on more or less than eight spatial regions.

Frame sequences longer or shorter than one second duration may be characterised by hash values. The duration of the sequence may be defined as a set number of frames or fields.

Spatial and temporal fingerprints may be derived for the fields of content that is sampled with an interlaced scanning raster. Spatial and temporal hash values created from the respective fingerprints for a sequence of fields can be searched according to the principle of the invention.

Fingerprints may be derived from spatially or temporally sub-sampled content.

It will be recognised that this invention has been described by way of example only and is limited in scope only be the appended claims

The invention claimed is:
1. A method of identifying an item of video content in stored video content, the method comprising:
   providing a collection of temporally separated search images, each defined by pixel values and each having a temporal location in the collection of temporally separated search images;
   forming respective pairs of search hash values for a plurality of query sequences in the collection defined by a traveling window of search images over a set time period in the collection of temporally separated search images, with each respective pair of search hash values comprising:
      a spatial search hash value comprising a function of a measure of entropy in values of differences between pixel values within each search image in each of the plurality of query sequences, and a temporal search hash value comprising a function of a measure of entropy in values of differences between a pixel value in a first search image in each of the plurality of query sequences and a corresponding pixel value in a temporally separated search image in each respective query sequence;

forming search data defining an association between temporal positions of each of the plurality of query sequences in the collection of temporally separated search images and the respective spatial and temporal search hash values for each of the plurality of query sequences;

ordering said search data according to values of a first one of the respective pairs of search hash values;

for a sought query sequence of temporally separated sought images, providing:
  a spatial sought hash value comprising a function of a measure of entropy in values of differences between pixel values within each sought image in the sought query sequence, and
  a temporal sought hash value comprising a function of a measure of entropy in values of differences between a pixel value in a first sought image in the sought query sequence and a corresponding pixel value in a temporally separated sought image in the sought query sequence; and
  searching only the ordered search data that corresponds to a sought value of the first one of the respective pairs of search hash values to locate an occurrence of a sought value of a second one of the respective pairs of hash values.

2. A method according to claim 1, further comprising forming a group of search images for each of the plurality of query sequences, and wherein the spatial search hash value comprises a function of a measure of entropy in values of differences between pixel values within a search image aggregated over search images within the group.

3. A method according to claim 1, further comprising forming a group of search images for each of the plurality of query sequences, and wherein the temporal search hash value comprises a function of a measure of entropy in values of differences between a pixel value in one search image and a pixel value in a temporally separated search image, aggregated over search images within the group.

4. A method according to claim 1, wherein the spatial sought hash value comprises a function of a measure of entropy in values of differences between pixel values within a sought image aggregated over sought images within the sought query sequence.

5. A method according to claim 1, wherein the temporal sought hash value comprises a function of a measure of entropy in values of differences between a pixel value in one sought image and a pixel value in a temporally separated sought image aggregated over sought images within the sought query sequence.

6. A method according to claim 1, wherein a hash value comprises a function of frequencies of occurrence of particular values of differences between pixel values and preferably of frequencies of occurrence of particular values of differences between average pixel values for image regions.

7. A method according to claim 6, further comprising summing respective spatial difference-value frequencies over a group of search images to form a spatial search hash value and over the sought sequence to form the spatial sought hash value.

8. A method according to claim 6, further comprising summing respective temporal difference-value frequencies over a group of search images to form a temporal search hash value and over the sought sequence to form the temporal sought hash value.

9. A method according to claim 6, further comprising providing frequency values for infrequently-occurring difference values a higher weight than frequently-occurring frequencies.

10. A method according to claim 9, further comprising normalizing frequency values by reducing the frequency values in proportion to a sum of magnitudes of the infrequently-occurring difference values to obtain a frequency value less than unity that is preferably weighted by its logarithm prior to summation.

11. A method according to claim 10, wherein said measure of entropy is given by:

$$-\Sigma p_{N'} \log(p_N)$$

where $p_N$ the normalised frequency of occurrence of a pixel difference value N and where the summation is over all possible values of N.

12. A method according to claim 1, further comprising forming said values of differences between pixel values used in forming search hash values from one or more respective fingerprints of search images.

13. A method according to claim 1, further comprising forming said values of differences between pixel values used in forming sought hash values from one or more respective fingerprints of sought images.

14. An apparatus for identifying an item of video content, the apparatus comprising:
  a memory storing instructions;
  a processor configured to execute the instructions to define a plurality of query sequences by a traveling window of search images over a set time period in a collection of temporally separated search images of the video content, and to determine respective pairs of search hash values for the plurality of query sequences, each respective pair of search hash values comprising:
    a spatial search hash value comprising a function of a measure of entropy in values of differences between pixel values within each search image in each of the plurality of query sequences, and
    a temporal search hash value comprising a function of a measure of entropy in values of differences between a pixel value in a first search image in each of the plurality of query sequences and a corresponding pixel value in a temporally separated search image in each respective query sequence; the apparatus comprising:
  a relational database configured to store:
    a first look up table defining an association between temporal positions of each of the plurality of query sequences in the collection of temporally separated search images and respective hash value pairs ordered according to values of a first one of the respective pairs of search hash values;
    a second look up table defining a portion of ordered search data in the first look up table corresponding to any particular value of the first one of the respective pairs of search hash values; and
    a search processor coupled to said relational database and configured to search only the portion of ordered search data in the second look up table that corresponds to a sought value of the first one of the respective pairs of search hash values to locate an occurrence of a sought value of a second one of the respective pairs of hash values.

15. The apparatus according to claim 14, wherein a group of search images is formed for each of the plurality of query sequences and the spatial search hash value comprises a function of a measure of entropy in values of differences between pixel values within a search image aggregated over search images within the group.

16. The apparatus according to claim 14, wherein a group of search images is formed for each of the plurality of query sequences and the temporal search hash value comprises a function of a measure of entropy in values of differences between a pixel value in one search image and a pixel value in a temporally separated search image, aggregated over search images within the group.

17. The apparatus according to claim 14, wherein the spatial sought hash value comprises a function of a measure of entropy in values of differences between pixel values within a sought image aggregated over sought images within a sought query sequence.

18. The apparatus according to claim 14, wherein the temporal sought hash value comprises a function of a measure of entropy in values of differences between a pixel value in one sought image and a pixel value in a temporally separated sought image aggregated over sought images within a sought query sequence.

19. The apparatus according to claim 14, wherein a hash value comprises a function of frequencies of occurrence of particular values of differences between pixel values and preferably of frequencies of occurrence of particular values of differences between average pixel values for image regions.

20. The apparatus according to claim 19, wherein respective spatial difference-value frequencies are summed over a group of search images to form a spatial search hash value and over a sought sequence to form the spatial sought hash value.

21. The apparatus according to claim 19, wherein respective temporal difference-value frequencies are summed over a group of search images to form a temporal search hash value and over a sought sequence to form the temporal sought hash value.

22. The apparatus according to claim 19, wherein frequency values for infrequently-occurring difference values are given higher weight than frequently-occurring frequencies.

23. The apparatus according to claim 22, wherein frequency values are normalised by reducing them in proportion to a sum of magnitudes of the infrequently-occurring difference values to obtain a frequency value less than unity that is preferably weighted by its logarithm prior to summation.

24. The apparatus according to Claim 14, wherein said measure of entropy is given by:

$$-\Sigma p_N \cdot \log(p_N)$$

where $p_N$ is the normalised frequency of occurrence of a pixel difference value N and where the summation is over all possible values of N.

25. The apparatus according to claim 14, wherein said values of differences between pixel values used in forming search hash values are formed from one or more respective fingerprints of search images.

26. The apparatus according to claim 14, wherein said values of differences between pixel values used in forming sought hash values are formed from one or more respective fingerprints of sought images.

27. A non-transitory computer readable storage medium containing instructions that when executed by a processor implement a method of identifying an item of stored video content, the method comprising:
    providing a collection of temporally separated search images, each defined by pixel values and each having a temporal location in the collection of temporally separated search images;
    forming respective pairs of search hash values for a plurality of query sequences in the collection defined by a traveling window of search images over a set time period in the collection of temporally separated search images, with each respective pair of search hash values comprising:
        a spatial search hash value comprising a function of a measure of entropy in values of differences between pixel values within each search image in each of the plurality of query sequences, and
        a temporal search hash value comprising a function of a measure of entropy in values of differences between a pixel value in a first search image in each of the plurality of query sequences and a corresponding pixel value in a temporally separated search image in each respective query sequence;
    forming search data defining an association between temporal positions of each of the plurality of query sequences in the collection of temporally separated search images and the respective spatial and temporal search hash values for each of the plurality of query sequences;
    ordering said search data according to values of a first one of the respective pairs of search hash values;
    for a sought query sequence of temporally separated sought images, providing:
        a spatial sought hash value comprising a function of a measure of entropy in values of differences between pixel values within each sought image in the sought query sequence, and
        a temporal sought hash value comprising a function of a measure of entropy in values of differences between a pixel value in a first sought image in the sought query sequence and a corresponding pixel value in a temporally separated sought image in the sought query sequence; and
    searching only the ordered search data that corresponds to a sought value of the first one of the respective pairs of search hash values to locate an occurrence of a sought value of a second one of the respective pairs of hash values.

* * * * *